(12) United States Patent
Nance et al.

(10) Patent No.: US 8,341,169 B2
(45) Date of Patent: Dec. 25, 2012

(54) OPEN PROFILE CONTENT IDENTIFICATION

(75) Inventors: Megan Nance, Sunnyvale, CA (US);
Mayur Datar, Santa Clara, CA (US);
Julie Tung, Mountain View, CA (US);
Bahman Rabii, Berkeley, CA (US);
Jason C. Miller, San Francisco, CA (US); Mike Hochberg, Sunnyvale, CA (US); Jeremiah Harmsen, Mountain View, CA (US); Tomasz J. Tunguz-Zawislak, San Fracisco, CA (US); Andres S. Perez-Bergquist, Mountian View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/727,186

(22) Filed: Mar. 18, 2010

(65) Prior Publication Data

US 2010/0174726 A1    Jul. 8, 2010

Related U.S. Application Data

(63) Continuation of application No. 11/694,307, filed on Mar. 30, 2007, now Pat. No. 7,730,017.

(51) Int. Cl.
*G06F 17/00* (2006.01)
(52) U.S. Cl. ........ 707/758; 707/767; 707/770; 707/791; 707/795
(58) Field of Classification Search .................. 707/758, 707/767, 770, 791, 795
See application file for complete search history.

(56) References Cited

U.S. PATENT DOCUMENTS

| | | | |
|---|---|---|---|
| 5,721,910 A | 2/1998 | Unger | |
| 5,724,521 A | 3/1998 | Dedrick | |
| 5,740,549 A | 4/1998 | Reilly et al. | |
| 5,752,023 A | 5/1998 | Choucri et al. | |
| 5,848,397 A | 12/1998 | Marsh et al. | |
| 5,948,061 A | 9/1999 | Merriman | |
| 6,009,410 A | 12/1999 | LeMole et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,345,293 B1 | 2/2002 | Chaddha | |
| 6,401,075 B1 | 6/2002 | Mason et al. | |
| 6,985,882 B1 | 1/2006 | Del Sesto | |
| 7,039,599 B2 | 5/2006 | Merriman | |

(Continued)

FOREIGN PATENT DOCUMENTS

KR    1020020005147    1/2002

(Continued)

OTHER PUBLICATIONS

European Examiner Tzvetanka Herry, European Search Report for Application No. EP 08 744 818.9, dated May 12, 2011, 6 pages.

(Continued)

*Primary Examiner* — Sana Al Hashemi
(74) *Attorney, Agent, or Firm* — Fish & Richardson P.C.

(57) ABSTRACT

Open profile data in a user profile, e.g., free-form fields in a user profile, are processed to identify interests and preferences of the user. The interests and preferences are utilized to identify categories associated with the user profile, and content items, e.g., advertisements, can be identified based on the categories.

19 Claims, 5 Drawing Sheets

U.S. PATENT DOCUMENTS

| | | | |
|---|---|---|---|
| 7,136,875 | B2 | 11/2006 | Anderson et al. |
| 7,158,986 | B1 | 1/2007 | Oliver et al. |
| 7,159,011 | B1 | 1/2007 | Knight et al. |
| 7,177,904 | B1 | 2/2007 | Mathur et al. |
| 7,269,590 | B2 | 9/2007 | Hull et al. |
| 7,526,459 | B2 | 4/2009 | Flinn et al. |
| 7,809,740 | B2 * | 10/2010 | Chung et al. .......... 707/758 |
| 2002/0049745 | A1 | 4/2002 | Yuichiro et al. |
| 2002/0103855 | A1 | 8/2002 | Chatani |
| 2003/0023489 | A1 | 1/2003 | McGuire et al. |
| 2003/0093311 | A1 | 5/2003 | Knowlson |
| 2004/0054577 | A1 | 3/2004 | Inoue et al. |
| 2004/0098386 | A1 | 5/2004 | Thint et al. |
| 2004/0143588 | A1 | 7/2004 | Russell |
| 2004/0193691 | A1 | 9/2004 | Chang |
| 2005/0119936 | A1 | 6/2005 | Buchanan et al. |
| 2005/0165766 | A1 | 7/2005 | Szabo |
| 2005/0171832 | A1 | 8/2005 | Hull et al. |
| 2005/0216300 | A1 | 9/2005 | Appelman et al. |
| 2005/0216550 | A1 | 9/2005 | Paseman et al. |
| 2005/0283497 | A1 | 12/2005 | Nurminen et al. |
| 2006/0048059 | A1 | 3/2006 | Etkin |
| 2006/0064360 | A1 | 3/2006 | Piccionelli et al. |
| 2006/0085417 | A1 | 4/2006 | John et al. |
| 2006/0200432 | A1 | 9/2006 | Flinn et al. |
| 2006/0230012 | A1 | 10/2006 | Ruvolo et al. |
| 2006/0235873 | A1 | 10/2006 | Thomas |
| 2006/0248573 | A1 | 11/2006 | Pannu et al. |
| 2006/0271953 | A1 | 11/2006 | Jacoby et al. |
| 2006/0278064 | A1 | 12/2006 | Lourdeaux |
| 2006/0282303 | A1 | 12/2006 | Hale et al. |
| 2007/0011155 | A1 | 1/2007 | Sarkar |
| 2007/0055656 | A1 | 3/2007 | Tunstall-Pedoe |
| 2007/0088713 | A1 | 4/2007 | Baxter et al. |
| 2007/0106627 | A1 | 5/2007 | Srivastava et al. |
| 2007/0112719 | A1 | 5/2007 | Reich et al. |
| 2007/0112762 | A1 | 5/2007 | Brubaker |
| 2007/0118802 | A1 | 5/2007 | Gerace et al. |
| 2007/0121843 | A1 | 5/2007 | Atazky et al. |
| 2007/0150537 | A1 | 6/2007 | Graham |
| 2007/0208789 | A1 | 9/2007 | Reichman |
| 2007/0218900 | A1 | 9/2007 | Abhyanker |
| 2007/0233736 | A1 | 10/2007 | Xiong et al. |
| 2007/0255707 | A1 | 11/2007 | Tresser et al. |
| 2007/0271234 | A1 | 11/2007 | Ravikiran |
| 2008/0005125 | A1 | 1/2008 | Gaedeke |
| 2008/0052371 | A1 | 2/2008 | Partovi et al. |
| 2008/0091692 | A1 | 4/2008 | Keith et al. |
| 2008/0104172 | A1 | 5/2008 | Craig |
| 2008/0243526 | A1 | 10/2008 | Nance et al. |
| 2008/0243607 | A1 | 10/2008 | Rohan et al. |
| 2008/0243780 | A1 | 10/2008 | Nance et al. |

FOREIGN PATENT DOCUMENTS

| | | |
|---|---|---|
| KR | 1020030051610 | 6/2003 |
| WO | WO97/21183 | 6/1997 |
| WO | WO03/007216 | 1/2003 |
| WO | WO2005/050513 | 6/2005 |
| WO | WO2005065229 A2 | 7/2005 |
| WO | WO2006104694 A2 | 10/2006 |
| WO | WO2008/121988 | 10/2008 |
| WO | WO2008/121989 | 10/2008 |
| WO | WO2008/121993 | 10/2008 |
| WO | WO2006135920 A3 | 4/2009 |

OTHER PUBLICATIONS

USPTO Office Action in U.S. Appl. No. 11/694,345, mailed Oct. 14, 2011.
Fish & Richardson P.C. Amendment in Reply to Action dated Oct. 14, 2011, in U.S. Appl. No. 11/694,345, filed Mar. 8, 2012.
Fish & Richardson P.C. Amendment in Reply to Action dated Jul. 6, 2009, in U.S. Appl. No. 11/694,618, filed Sep. 8, 2009.
USPTO Office Action in U.S. Appl. No. 11/694,618, mailed Oct. 28, 2011.
Fish & Richardson P.C. Amendment in Reply to Action dated Oct. 28, 2011, in U.S. Appl. No. 11/694,618 mailed Mar. 28, 2012.
USPTO Office Action in U.S. Appl. No. 11/694,307, mailed Mar. 18, 2009.
Fish & Richardson P.C. Amendment in Reply to Action dated Mar. 18, 2009 in U.S. Appl. No. 11/694,307 mailed Jun. 18, 2009.
USPTO Office Action in U.S. Appl. No. 11/694,345, mailed Jun. 24, 2009.
Fish & Richardson P.C. Amendment in Reply to Action dated Jun. 24, 2009, in U.S. Appl. No. 11/694,345 mailed Oct. 26, 2009.
USPTO Office Action in U.S. Appl. No. 11/694,345, mailed Jan. 29, 2010.
Fish & Richardson P.C. Amendment in Reply to Action dated Jan. 29, 2010, in U.S. Appl. No. 11/694,345 mailed Apr. 29, 2010.
USPTO Office Action in U.S. Appl. No. 11/694,345, mailed Jul. 20, 2010.
Fish & Richardson P.C. Amendment in Reply to Action dated Jul. 20, 2010, in U.S. Appl. No. 11/694,345 mailed Dec. 20, 2010.
Fish & Richardson P.C. RCE in Reply to Action dated Jul. 20, 2010, in U.S. Appl. No. 11/694,345 mailed Jan. 20, 2011.
USPTO Office Action in U.S. Appl. No. 11/694,345, mailed Feb. 17, 2011.
USPTO Office Action in U.S. Appl. No. 11/694,618, mailed Jan. 27, 2009.
Fish & Richardson P.C. Amendment in Reply to Action dated Jan. 27, 2009, in U.S. Appl. No. 11/694,618, filed Apr. 27, 2009.
USPTO Office Action in U.S. Appl. No. 11/694,618 mailed Jul. 6, 2009.
Fish & Richardson P.C. Amendment in Reply to Action dated Jul. 6, 2009, in U.S. Appl. No. 11/694,618 mailed Sep. 8, 2009.
Fish & Richardson P.C. Rce and Amendment in Reply to Action dated Jul. 6, 2009, in U.S. Appl. No. 11/694,618 mailed Feb. 2, 2010.
USPTO Office Action in U.S. Appl. No. 11/694,618, mailed Apr. 15, 2010.
Fish & Richardson P.C. Amendment in Reply to Action dated Apr. 15, 2010, in U.S. Appl. No. 11/694,618 mailed Aug. 16, 2010.
USPTO Office Action in U.S. Appl. No. 11/694,618, mailed Nov. 16, 2010.
Fish & Richardson P.C. Amendment in Reply to Action dated Nov. 6, 2010, in U.S. Appl. No. 11/694,618 mailed Mar. 15, 2011.
USPTO Office Action in U.S. Appl. No. 11/694,618, mailed Apr. 15, 2011.
Supplementary European Search Report for Application No. EP 08 744 818.9, dated May 4, 2011, 3 pages.
Supplemental European Search Report for Application No. EP 08 79 9736, dated Feb. 7, 2011, 3 pages.
Examination Report for Application No. 08 799 736.7, dated Feb. 17, 2011, 5 pages.
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Dedrick, R., A Consumption Model for Targeted Electronic Advertising, Intel Architecture Labs, IEEE, 1995.
Dedrick, R., Interactive Electronic Advertising, IEEE, 1994.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Spertus, E., et al. (2005) "Evaluating Similarity Measures: A Large-Scale Study in the Orkut Social Network". Appeared in: KDD '05:

The Eleventh ACM SIGKDD International Conference on Knowledge Discovery and Data Mining, Chicago, IL.

Zeff, R. et al., Advertising on the Internet, 2nd Ed., John Wiley & Sons, 1999.

International Preliminary Report on Patentability in Application No. PCT/US08/058949, dated Oct. 6, 2009.

International Search Report and Written Opinion in Application No. PCT/US08/058949, dated Sep. 12, 2008.

International Preliminary Report on Patentability in Application No. PCT/US08/058948, dated Oct. 6, 2009.

International Search Report and Written Opinion in Application No. PCT/US2008/058948, dated Aug. 7, 2008.

International Search Report and Written Opinion in Application No. PCT/US2008/058953, dated Sep. 19, 2008.

International Preliminary Report on Patentability in Application No. PCT/US2008/058953, dated Oct. 6, 2009.

Action & Response History in U.S. Appl. No. 11/694,345.

Action & Response History in U.S. Appl. No. 11/694,618.

International Preliminary Report on Patentability in Application No. PCT/US08/058949, dated Aug. 17, 2011.

Fish & Richardson P.C. Amendment in Reply to Action dated Feb. 17, 2011, in U.S. Appl. No. 11/694,345, mailed Jun. 17, 2011.

Fish & Richardson P.C. Amendment in Reply to Action dated Apr. 15, 2011, in U.S. Appl. No. 11/694,618 mailed Aug. 15, 2011.

* cited by examiner

OPEN PROFILE CONTENT IDENTIFICATION

This application is a continuation of application Ser. No. 11/694,307, filed Mar. 30, 2007 now U.S. Pat. No. 7,730,017. This application is also related to U.S. patent application Ser. No. 11/694,618, filed on Mar. 30, 2007, entitled "Custodian Based Content Identification," and Ser. No. 11/694,345, filed on Mar. 30, 2007, entitled "Related Entity Content Identification". The entire teachings of the above applications are incorporated herein by reference in their entireties.

BACKGROUND

This application relates to content identification.

Online social networks have become popular for professional and/or social networking. Some online social networks provide content items that may be of interest to users, e.g., digital advertisements targeted to a user, or identification of other users and/or groups that may of interest to a user. The content items can, for example, be selected based on content of a user account, e.g., based on keywords identified from a crawl of a user's page. Such content item identification schemes, however, may not identify optimum content items if the user page includes only short, ambiguous messages, misspelled words, or is primarily non-textual content, e.g., photograph collections, that present unique challenges for machine-based relevance analysis.

Additionally, such content identification schemes do not readily facilitate advertiser targeting of publishers that may have a broad range of visiting users, e.g., social networks. For example, social networking sites have users that have many different interests, and thus advertisers may not readily identify particular verticals for the social networking site. Accordingly, some of the content items, e.g., advertisements directed to particular products, may not be of interest to many users of an online social network.

SUMMARY

Described herein are systems and methods for facilitating open profile content identification. In one implementation, open profile data in one or more user profiles are identified, and categories defined by the open profile data are identified. One or more content items based on the categories can then be identified.

In another implementation, free-form text data in a user profile is identified, and category indicia is extracted from the free-form text data. One or more content items based on the category indicia can then be identified.

In another implementation, a system includes a natural language processor, a sentiment detection processor, and a category processor. The natural language processor is configured to extract one or more phrases from free-form text data in a user profile and assign phrase weights to the extracted phrases. The sentiment detection processor is configured to identify user interests and non-interests from the free-form text data in the user profile. The category processor is configured to associate labels with a user profile based on the extracted one or more phrases, assigned phrase weights, and the identified user interests and non-interests.

In another implementation, open profile data in user profiles are identified and categories defined by the open profile data are identified. The categories are associated with corresponding user profiles.

DETAILED DESCRIPTION

Figure 1:
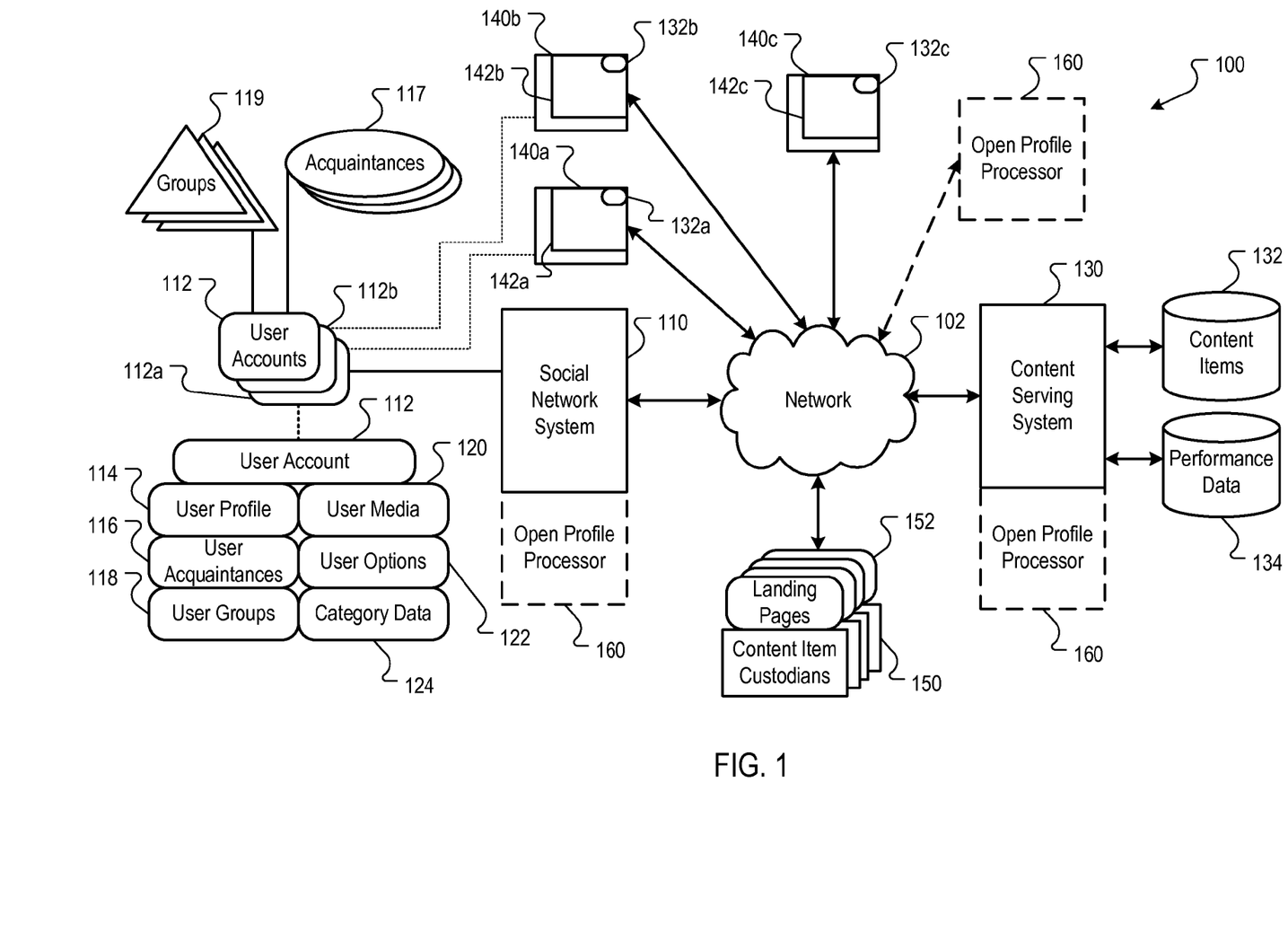
FIG. 1 is a block diagram of an example system for identifying content items based on open profile data.

FIG. 1 is a block diagram of an example system 100 for identifying content items based on open profile data. Open profile data in one or more user profiles, e.g., free-form fields in a user profile, are identified and processed to identify interests and preferences of the one or more users. The interests and preferences are utilized to identify categories associated with the user profiles, and content items, e.g., advertisements, can be identified based on the categories.

In an implementation, a social network system 110 can, for example, host numerous user accounts 112. An example social network system can include Orkut, hosted by Google, Inc., of Mountain View, Calif. Other social networks can, for example, include school alumni websites, an internal company web site, dating networks, etc.

Each user account 112 can, for example, include user profile data 114, user acquaintance data 116, user group data 118, user media data 120, user options data 122, and category data 124. Other user data can also be included in the user accounts 112.

The user profile data 114 can, for example, include general demographic data about an associated user, such as age, sex, location, interests, etc. In some implementations, the user profile data 114 can also include professional information, e.g., occupation, educational background, etc., and other data, such as contact information. In some implementations, the user profile data 114 can include open profile data, e.g., free-form text that is typed into text fields for various subjects, e.g., "Job Description," "Favorite Foods," "Hobbies," etc., and constrained profile data, e.g., binary profile data selected by check boxes, radio buttons, etc., or predefined selectable profile data, e.g., income ranges, zip codes, etc. In some implementations, some or all or the user profile data 114 can be classified as public or private profile data, e.g., data that can be shared publicly or data that can be selectively shared. Profile data 114 not classified as private data can, for example, be classified as public data, e.g., data that can be viewed by any user accessing the social network system 110.

The user acquaintances data 116 can, for example, define user acquaintances 117 associated with a user account 112. In an implementation, user acquaintances 117 can include, for example, users associated with other user accounts 112 that are classified as "friends," e.g., user accounts 112 referenced in a "friends" or "buddies" list. Other acquaintances 117 can also be defined, e.g., professional acquaintances, client acquaintances, family acquaintances, etc. In an implementation, the user acquaintance data 116 for each user account 112 can, for example, be specified by users associated with each user account 112, and thus can be unique for each user account 112.

The user group data 118 can, for example, define user groups 119 to which a user account 112 is associated. In an implementation, user groups 119 can, for example, define an interest or topic, e.g., "Wine," "Open Source Chess Programming," "Travel Hints and Tips," etc. In an implementation, the user groups 119 can, for example, be categorized, e.g., a first set of user groups 119 can belong to an "Activities" category, a second set of user groups 119 can belong to an "Alumni & Schools" category, etc.

The user media data 120 can, for example, include one or more content items, such as user documents, e.g., web pages. A document can, for example, comprise a file, a combination of files, one or more files with embedded links to other files, etc. The files can be of any type, such as text, audio, image, video, hyper-text mark-up language documents, etc. In the context of the Internet, a common document is a Web page. Other content items can also be defined by the user media data 120.

The user options data 122 can, for example, include data specifying user options, such as e-mail settings, acquaintance notification settings, chat settings, password and security settings, etc. Other option data can also be included in the user options data 122.

The category data 124 can, for example, include data that can be utilized by a content serving system 130 to identify one or more content items 132 that are determined to be relevant to a user account 112, e.g., advertisements for products and/or services that may be of interest to a user associated with a user account 112.

In an implementation, a content serving system 130 can directly, or indirectly, enter, maintain, and track content items 132. The content items 132 can, for example, include a web page or other content document, or text, graphics, video, audio, mixed media, etc. In one implementation, the content items 132 are advertisements. The advertisements 132 can, for example, be in the form of graphical ads, such as banner ads, text only ads, image ads, audio ads, video ads, ads combining one of more of any of such components, etc. The advertisements 132 can also include embedded information, such as links, meta-information, and/or machine executable instructions.

In an implementation, user devices 140a, 140b and 140c can communicate with the social network system 110 over a network 102, such as the Internet. The user devices 140 can be any device capable of receiving the user media data 120, such as personal computers, mobile devices, cell phones, personal digital assistants (PDAs), television systems, etc. The user devices 140 can be associated with user accounts 112, e.g., the users of user devices 140a and 140b can be logged-in members of the social network system 110, having corresponding user accounts 112a and 112b. Additionally, the user devices 140 may not be associated with a user account 112, e.g., the user of the user device 142c may not be a member of the social network system 110 or may be a member of the social network system 110 that has not logged in.

In one implementation, upon a user device 140 communicating a request for media data 120 of a user account 112, or a request for some other social network media data, to the social network system 110, the social network system 110 can, for example, provide the user media data 120 or the other requested media data to user device 140. In one implementation, the user media data 120 or other requested media data can include an embedded request code, such as Javascript code snippets. In another implementation, the social network system 110 can insert the embedded request code into the user media data 120 or the other requested media data when served to a user device 140.

The user device 140 can render the requested data, e.g., a user web page, or some other social network 110 page, in a presentation environment 142, e.g., in a web browser application. Upon rendering the requested data, the user device 140 executes the request code, which causes the user device 140 to issue a content request, e.g., an advertisement request, to the content serving system 130. In response, the content serving system 130 can provide one or more content items 132 to the user device 140. For example, the content items 132a, 132b and 132c can be provided to the user devices 140a, 140b and 140c, respectively. In one implementation, the content items 132a, 132b and 132c are presented in the presentation environments 142a, 142b and 142c, respectively.

In an implementation, the content items 132a, 132b and 132c can be provided to the content serving system 130 by content item custodians 150, e.g., advertisers. The advertisers 150 can, for example, include web sites having "landing pages" 152 that a user is directed to when the user clicks an advertisement 132 presented on page provided from the social networking system 110. For example, the content item custodians 150 can provide content items 132 in the form of "creatives," which are advertisements that may include text, graphics and/or audio associated with the advertised service or product, and a link to a web site.

In one implementation, the content serving system 130 can monitor and/or evaluate performance data 134 related to the content items 132. For example, the performance of each advertisement 132 can be evaluated based on a performance metric, such as a click-through rate, a conversion rate, or some other performance metric. A click-through can occur, for example, when a user of a user device, e.g., user device 140a, selects or "clicks" on an advertisement, e.g. the advertisement 132a. The click-through rate can be a performance metric that is obtained by dividing the number of users that clicked on the advertisement or a link associated with the advertisement by the number of times the advertisement was delivered. For example, if advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user of the user device 140a clicks on an advertisement 132a, is referred to the advertiser's Web page, such as one of the landing pages 152, and consummates a purchase before leaving that Web page. Other conversion types can also be used. A conversion rate can, for example, be defined as the ratio of the number of conversions to the number of impressions of the advertisement (i.e., the number of times an advertisement is rendered) or the ratio of the number of conversions to the number of selections. Other types of conversion rates can also be used.

Other performance metrics can also be used. The performance metrics can, for example, be revenue related or non-revenue related. In another implementation, the performance metrics can be parsed according to time, e.g., the performance of a particular content item 132 may be determined to be very high on weekends, moderate on weekday evenings, but very low on weekday mornings and afternoons, for example.

It is desirable that each of the content items 132 be related to the interests of the users utilizing the user devices 140a, 140b and 140c, as users are generally more likely to select, e.g., click through, content items 132 that are of particular interest to the users. In one implementation, relevant content items 132 are identified by identifying category data 124 for each user account 112, and providing the category data 124 to the content serving system 130. Such category data 124 can, for example, be based on open-profile data stored in corresponding user profiles 114, e.g., free-form text fields. The category data 124 of a particular user account, e.g. user account 112a can, for example, be provide to the content serving system 130 by a user device 140 associated with the particular user account 112, e.g., the user device 140a upon which a logged in session for the particular user account 112a has been established.

In another implementation, category data related to the user accounts 112 can be provided to advertisers, e.g., the content item custodians 150. Such category data can, for example, be based on the category data 124 identified for each of the user accounts 112. Such category data can facilitate the targeting of content items 132, e.g., advertisements, to social networking sites that have users that have many different interests. For example, the category data related to the category data 124 of each user account may identify that the users of the social network 110 are predominately interested in extreme sports, sport utility vehicles, and fitness. Accordingly, one or more content item custodians 150 could target such advertisements to users of the social network system 110.

In one implementation, an open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Figure 9:
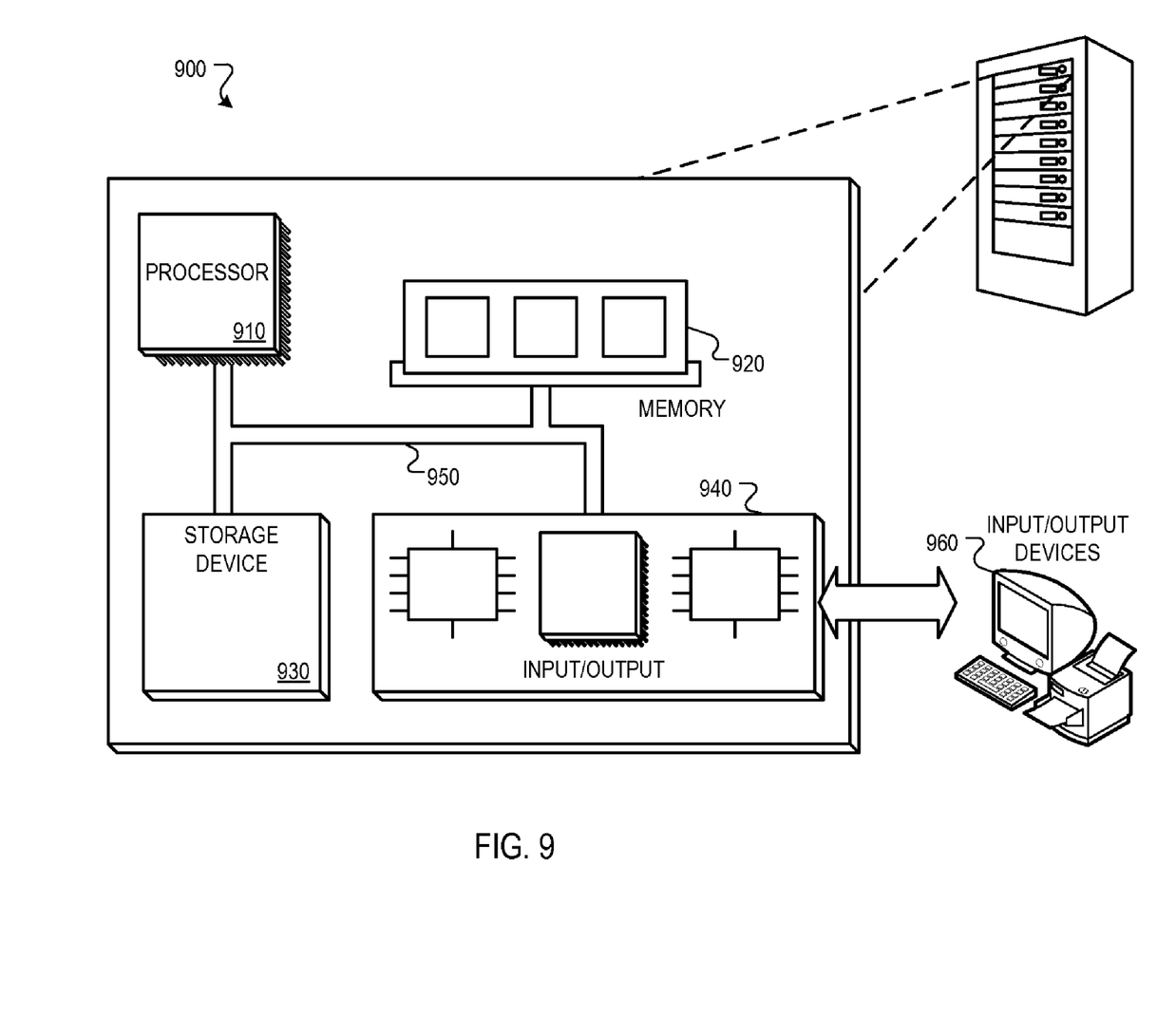
FIG. 9 is a block diagram of an example computer system that can be utilized to implement the systems and methods described herein.

The open profile processor 160 can be implemented in software and executed on a processing device, such as the computer system 900 of FIG. 9. Example software implementations include C, C++, Java, or any other high-level programming language that may be utilized to produce source code that can be compiled into executable instructions. Other software implementations can also be used, such as applets, or interpreted implementations, such as scripts, etc.

Figure 2:
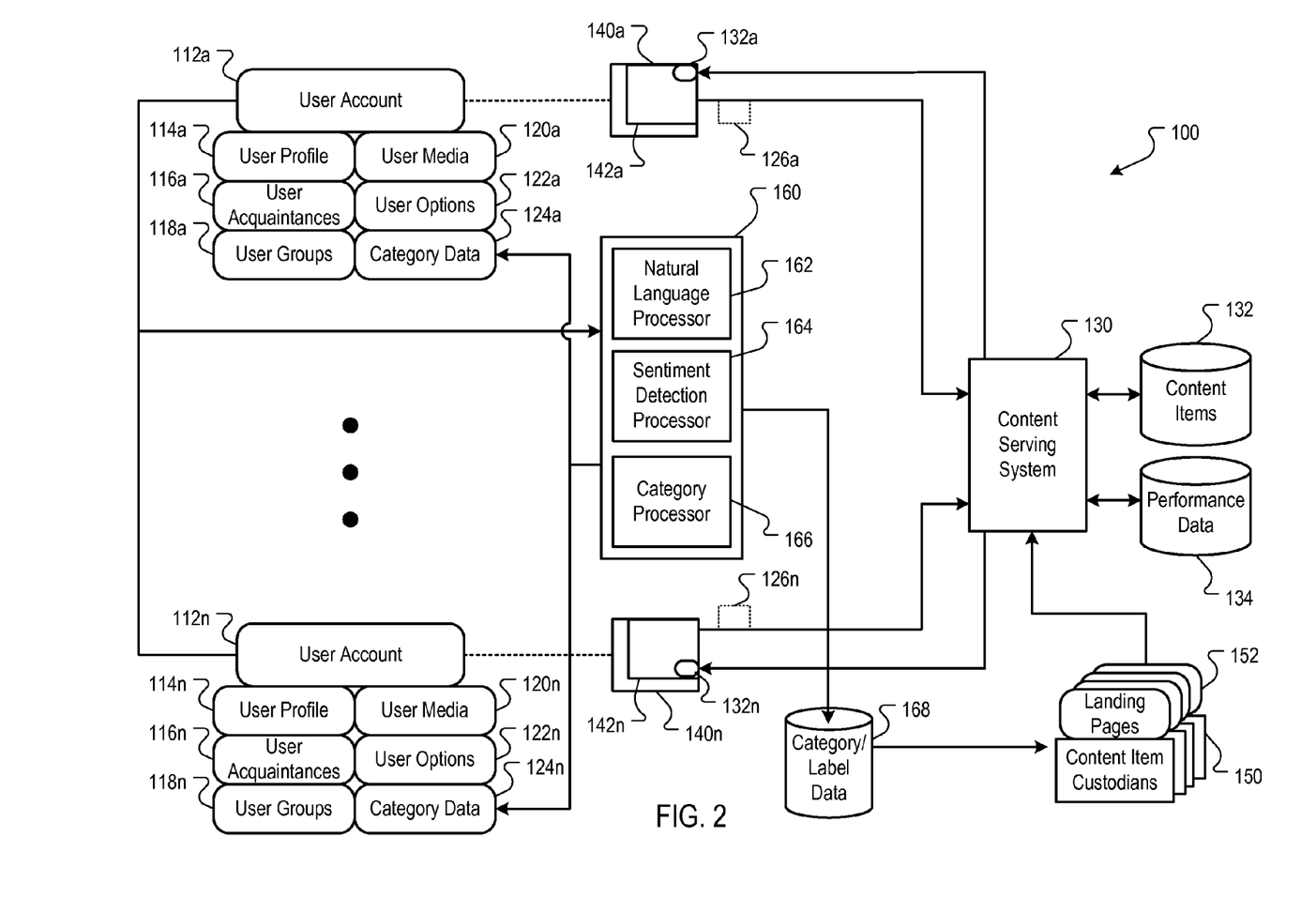
FIG. 2 is a more detailed block diagram of the example system for identifying content items based on open profile data.

FIG. 2 is a more detailed block diagram of the example system 100 for identifying content items based on open profile data. In the example system 100 of FIG. 2, the open profile processor 160 can include a natural language processor 162, a sentiment detection processor 164, and a category processor 166. The open profile processor 160 can utilize open profile data of the user profile data 114a-114n of the user accounts 112a-112n to generate corresponding category data 124a-124n.

In one implementation, the open-profile data within the user profile data 114 is processed to identify psychographic information, e.g., traits such as personality, values, attitudes, interests, lifestyles, etc. of the users associated with the user accounts 112a-112n. For example, the user profile data 114a may include a free-form text field entitled "Hobbies," and the text field may include the sentence "I really enjoy hiking, especially long hikes when you can camp out for a few days. Indoor activities don't interest me at all, and I really don't like boring outdoor activities like gardening." The natural language processor 162, the sentiment detection processor 164, and the category processor 166 can, for example, process the open profile data and identify the categories of "Hiking" and "Camping" as categories of interest, and identify the category of "Gardening" as a category of non-interest. Accordingly, in one implementation, the category data 124a can include the categories of "Hiking" and "Camping." In another implementation, the category data 124a can include both interest categories and non-interest categories. Thus, for the above example, the category data 124 can include the interest categories of "Hiking" and "Camping," and can include the non-interest category of "Gardening."

In one implementation, an example process flow for identifying categories related to the interests of one or more users begins when the natural language processor 162 receives the open profile data of one or more user profiles 114, e.g., free form text of one or more user profiles. The natural language processor 162 can, for example, be configured to extract phrases from the open profile data and assign a weight to each extracted phrase. For example, the natural language process 162 can utilize a part-of-speech (POS) tagger and a dependency relation parser to extract noun phrases. For each noun phrase, the nouns and any related adjectives can be retained.

For each of the extracted noun phrases, the natural language processor 162 can, for example, assign a default weight to the phrase that depends on the number of nouns in the phrase. In one implementation, the weight can be in substantial proportion to the quantity of nouns in the phrase, e.g., more nouns will result in a higher weight. In another implementation, the natural language processor 162 can also adjust the weight of the phrase in response to the number of adjectives in the noun phrase. In one implementation, the weight can be in substantial proportion to the quantity of adjectives in the phrase, e.g., more adjectives will result in a higher weight.

Other weighting schemes can also be used, e.g., other parts of speech may decrease the weight of the noun phrase; adjectives can be weighted less than nouns, etc. In one implementation, the natural language processor 162 can, for example, implement a term frequency-inverse document frequency (TF-IDF) weighting to discount phrases that occur above a threshold frequency in the open profile data of one or more of the user profiles 112a-112n.

In another implementation, the sentiment detection processor 164 can identify sentiments, e.g., opinions, interests and/or non-interests related to identified subject matter, such as nouns or noun phrases. In one implementation, the sentiment detection processor 164 can implement polarity analysis, e.g., detection of a negative or positive verb phrase related to an object noun, e.g. "don't like," and "like," may be identified as being related to respective nouns "gardening" and "hiking." The sentiment detection processor 164 can, for example, discount nouns or noun phrases for which a user has expressed disinterest, and can appreciate nouns or noun phrases for which a user has expressed an interest. Other sentiment analysis schemes can also be used.

In one implementation, the category processor 166 can, for example, determine whether the phrases weighted by the natural language processor 162 and/or the sentiment detection processor 164 exceeds a threshold. For the phrases having weights that exceed the threshold, the category processor 166 can identify one or more categories or interests based on the phrases. In another implementation, the category processor 166 can, for example, identify one or more categories or interests based on a set of the highest weighted phrases that remain after discounting phrases of non-interest.

In one implementation, the category processor 166 can identify the categories by clustering based on the phrase and weight pairs for phrases identified from the open profile data in a plurality of user profiles 114a-114n. In another implementation, the categories can be identified by keywords defined by the phrases. Other category identifications schemes can also be used.

In another implementation, the identified categories can be further categorized according to category labels. A category label can categorize specific categories into a more general category, e.g., the categories of "hang gliding" and "rock climbing" can be categorized under the category label of "extreme sports."

The identified categories and/or category labels for each user account 112*a*-112*n* can be stored in the corresponding category data 124*a*-124*n*. In one implementation, the category data 124 of a particular user account, e.g. user account 112*a* can, for example, be provide to the content serving system 130 by a user device 140 associated with the particular user account 112, e.g., the user device 140*a* upon which a logged in session for the particular user account 112*a* has been established. For example, if the user device 140*a* renders a web page from the social network system 110 that includes a content item request instruction, a corresponding content item request 126*a* that includes the category data 124*a* can be provided to the content serving system 130. The content serving system 130 can identify and serve one or more content items 132*a* for presentation on the user device 140*a* in response to the request 126*a* and the category data 124*a*.

Other schemes can also be used to provide the category data 124*a* to the content server system 130. For example, the content serving system 130 may partner with the social network system 110 to receive user account 112 identifiers in corresponding content requests 126*a*-126*n*. In response to receiving the user account 112 identifiers, the content serving system 130 can transmit the user account 112 identifiers to the social network system 110 in a request for corresponding category data 124. The social network system 110 can, in response, provide the corresponding category data 124 to the content serving system 130.

In another implementation, aggregated category and label data 168 related to the user accounts 112 can be provided to advertisers, e.g., the content item custodians 150. Such category data and label data 168 can, for example, facilitate the targeting of content items 132, e.g., advertisements, to social networking sites that have users having many different interests. For example, the category and label data 168 for the social network system 110 may identify a set of highly relevant marketing verticals for which many of the users of the social network system 110 may have a strong interest. Accordingly, one or more content item custodians 150 can target advertisements related to the verticals to users of the social network system 110.

In one implementation, the open profile processor 160 can process the user accounts 112*a*-112*n* periodically, e.g., monthly, to revise the category data 124 and/or the category and label data 168. Other processing triggers, e.g., changes in the user account 112 corpus, can also be used. In one implementation, the social open profile processor 160 can process the user accounts 112*a*-112*n* in an offline batch process. The processing results can, for example, be stored and accessed during the serving of content. In another implementation, the open profile processor 160 can process the user accounts 112*a*-112*n* in an online process, e.g., in response to a user device 140 submitting a content request to the social network system 110.

Figure 3:
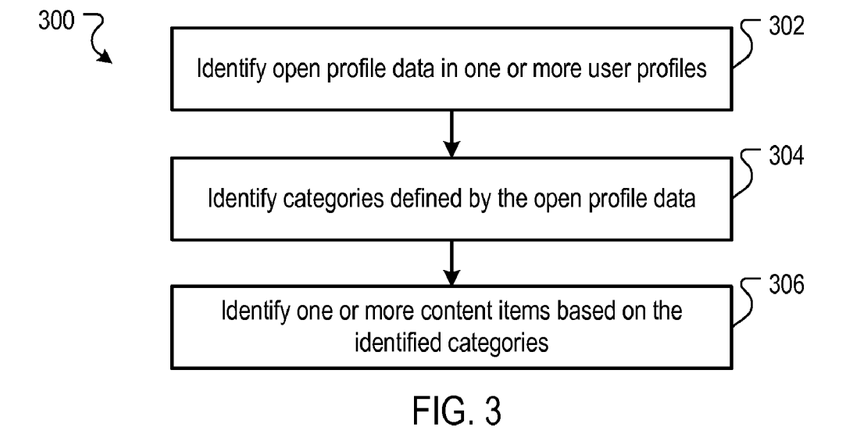
FIG. 3 is a flow diagram of an example process for identifying content items based on open profile data.

FIG. 3 is a flow diagram of an example process 300 for identifying content items based on open profile data. The process 300 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 302 identifies open profile data in one or more user profiles. For example, the open profile processor 160 and/or the natural language processor 162 can identify open profile data, e.g., free form text data, in the user profiles 112*a*-112*n*.

Stage 304 identifies categories defined by the open profile data. For example, the open profile processor 160 and/or the category processor 166 can identify categories by clustering or keyword identification. The identified categories can, for example, be associated with corresponding user profiles 112.

Stage 306 identifies one or more content items based on the identified categories. For example the content serving system 130 can identify content items 132 based on the category data 124 and/or the category and label data 138.

Other processes for identifying content items based on open profile data can also be used.

Figure 4:
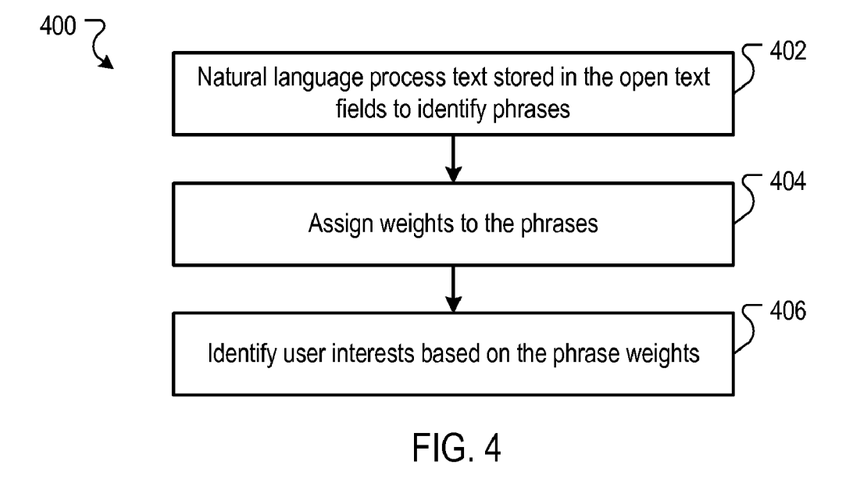
FIG. 4 is a flow diagram of an example process for identifying user interests based on open profile data.

FIG. 4 is a flow diagram of an example process 400 for identifying user interests based on open profile data. The process 400 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 402 performs natural language processing of text stored in the open text field to identify phrases. For example, the open profile processor 160 and/or the natural language processor 162 can perform natural language processing to identify noun phrase in the open profile data of the user profiles 114*a*-114*n*.

Stage 404 assigns weights to the phrases. For example, the open profile processor 160 and/or the natural language processor 162 can assign weights to the identified noun phrases.

Stage 406 identifies user interests based on the phrase weights. For example, the open profile processor 160 and/or the natural language processor 162 can identify user interests based on the phrase weights, e.g., phrases having weights exceeding a threshold can be utilized to define user interests, or clustering based on phrase and weight pairs can be performed to define user interests.

Other processes for identifying user interests based on open profile data can also be used.

Figure 5:
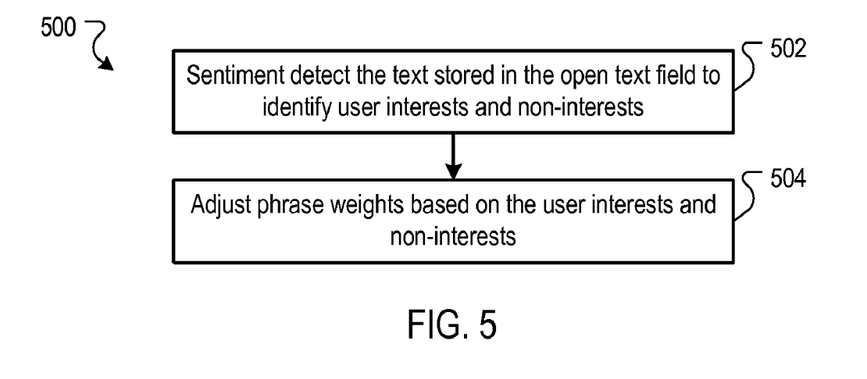
FIG. 5 is a flow diagram of an example process for identifying user interests and non-interests based on open profile data.

FIG. 5 is a flow diagram of an example process 500 for identifying user interests and non-interests based on open profile data. The process 500 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 502 performs sentiment detection on text stored in the open text field to identify user interests and non-interests. For example, the open profile processor 160 and/or the sentiment detection processor 164 can perform polarity detection to identify user interests and non-interests.

Stage 504 adjusts phrase weights based on the user interests and non-interests. For example, the open profile processor 160 and/or the sentiment detection processor 164 can increase or decrease phrase weights based on the user interests and non-interests, respectively.

Other processes for identifying user non-interests based on open profile data can also be used.

Figure 6:
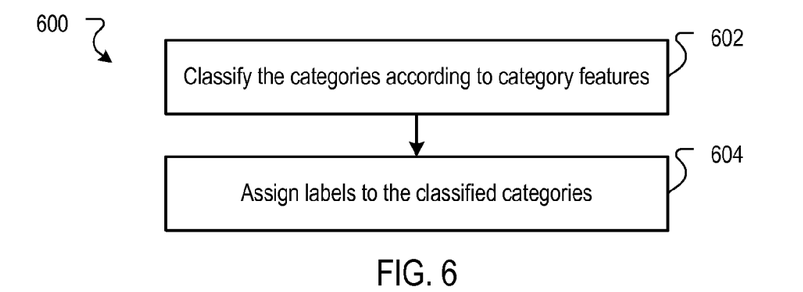
FIG. 6 is a flow diagram of an example process for classifying categories and labels.

FIG. 6 is a flow diagram of an example process 600 for classifying categories and labels. The process 600 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 602 classifies the categories according to category features. For example, the open profile processor 160 and/or the category processor 166 can classify categories according to a category feature, e.g., a general sports category, a general movie category, etc.

Stage 604 assigns labels to the classified categories. For example, the open profile processor 160 and/or the category processor 166 can assign labels to the classified categories, e.g., "Extreme Sports," "Comedy Movies," etc.

Other processes for classifying categories and labels can also be used.

Figure 7:
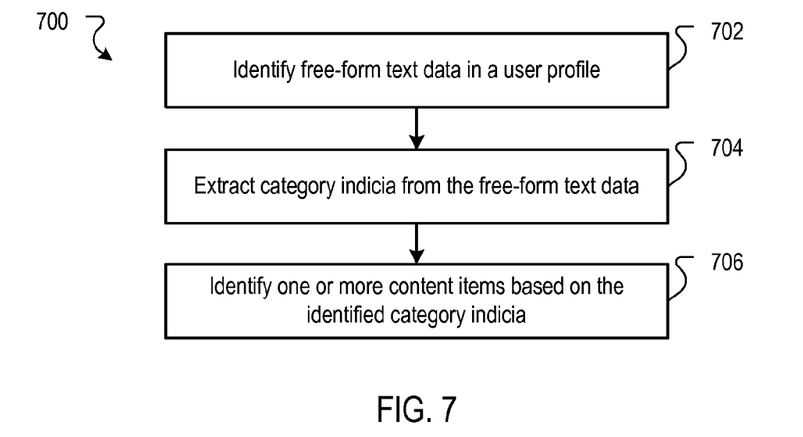
FIG. 7 is a flow diagram of an example process for identifying content items based on free-form text data.

FIG. 7 is a flow diagram of an example process 700 for identifying content items based on free-form text data. The process 700 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 702 identifies free-form text data in a user profile. For example, the open profile processor 160 and/or the natural language processor 162 can identify open profile data, e.g., free form text data, in the user profiles 112a-112n.

Stage 704 extracts category indicia from the free-form text data. For example, the open profile processor 160 and/or the category processor 166 can extract category indicators, e.g., keywords, etc., from the free-form text data.

Stage 706 identifies one or more content items based on the identified category indicia. For example, the content serving system 130 can identify one or more content items 132 based on the extracted keywords.

Other processes for identifying content items based on free-form text data can also be used.

Figure 8:
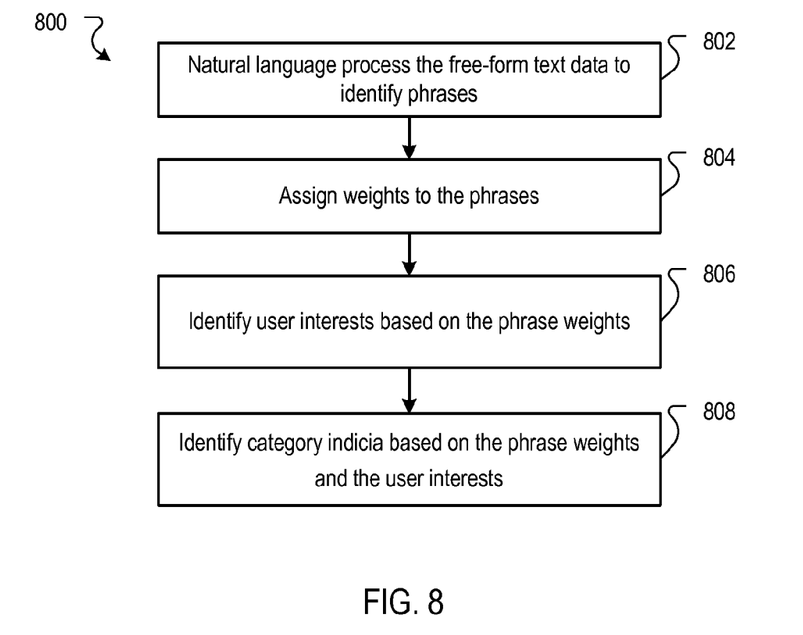
FIG. 8 is a flow diagram of an example process for identifying categories based on free form text data.

FIG. 8 is a flow diagram of an example process 800 for identifying categories based on free form text data. The process 800 can, for example, be implemented in the open profile processor 160. In one implementation, the open profile processor 160 can include the natural language processor 162, the sentiment detection processor 164, and the category processor 166. Other implementations, however, can also be used. In one implementation, the open profile processor 160 can be integrated into the social network system 110. In another implementation, the open profile processor 160 can be integrated into the content server system 130. In another implementation, the open profile processor 160 can be a separate system in data communication with the social network system 110 and/or the content server system 130.

Stage 802 performs natural language processing on the free-form text data to identify phrases. For example, the open profile processor 160 and/or the natural language processor 162 can perform natural language processing to identify noun phrase in the open profile data of the user profiles 114a-114n.

Stage 804 assigns weights to the phrases. For example, the open profile processor 160 and/or the natural language processor 162 can assign weights to the identified noun phrases.

Stage 806 identifies user interests based on the phrase weights. For example, the open profile processor 160 and/or the natural language processor 162 can identify user interests based on the phrase weights, e.g., phrases having weights exceeding a threshold can be utilized to define user interests, or clustering based on phrase and weight pairs can be performed to define user interests.

Stage 808 identifies category indicia based on the phrase weights and the user interests. For example, the open profile processor 160 and/or the category processor 166 can extract category indicators, e.g., keywords, clusters, etc., based on the phrase weights and the user interests.

Other processes for identifying categories based on free form text data can also be used.

FIG. 9 is a block diagram of an example computer system 900 that can be utilized to implement the systems and methods described herein. The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method performed by a data processing apparatus, comprising:
   receiving profile data associated with a user account;
   identifying phrases in free-form text data in the received profile data, the phrases comprising one or more nouns and one or more adjectives, wherein the free-form text data is free-form text that is entered by a user into one or more text fields in a user profile of the user account and is not input in response to selecting constrained or predefined profile data;
   assigning weights to the phrases identified in the free-form text data in the received profile data based at least in part on the one or more nouns;
   determining user interests and user non-interests from the phrases identified in the free-form text data based at least in part on the one or more adjectives;
   adjusting the weights assigned to the phrases identified in the free-form text data based on the user interests and user non-interests determined at least in part from the one or more adjectives from the phrases identified in the free-form text data; and
   associating one or more category labels with the profile data based on the phrases identified in the free-form text data and the adjusted weights assigned to the phrases identified in the free-form text data.

2. A system comprising:
   a data processing apparatus; and
   a memory in data communication with the data processing apparatus and storing instructions executable by the data processing apparatus and upon such execution cause the data processing apparatus to perform operations comprising:
   receiving profile data associated with a user account;
   identifying phrases in free-form text data in the received profile data, the phrases comprising one or more nouns and one or more adjectives, wherein the free-form text data is free-form text that is entered by a user into one or more text fields in a user profile of the user account;
   assigning weights to the phrases identified in the free-form text data in the received profile data based at least in part on the one or more nouns;
   determining user interests and user non-interests from the phrases identified in the free-form text data based at least in part on the one or more adjectives;
   adjusting the weights assigned to the phrases identified in the free-form text data based on the user interests and user non-interests determined at least in part from the one or more adjectives from the phrases identified in the free-form text data; and
   associating one or more category labels with the profile data based on the phrases identified in the free-form text data and the adjusted weights assigned to the phrases identified in the free-form text data.

3. A computer storage medium encoded with a computer program, the program comprising instructions that when executed by data processing apparatus cause the data processing apparatus to perform operations, comprising:
   receiving profile data associated with a user account;
   identifying phrases in free-form text data in the received profile data, the phrases comprising one or more nouns and one or more adjectives, wherein the free-form text data is free-form text that is entered by a user into one or more text fields in a user profile of the user account;
   assigning weights to the phrases identified in the free-form text data in the received profile data based at least in part on the one or more nouns;
   determining user interests and user non-interests from the phrases identified in the free-form text data based at least in part on the one or more adjectives;
   adjusting the weights assigned to the phrases identified in the free-form text data based on the user interests and user non-interests determined at least in part from the one or more adjectives from the phrases identified in the free-form text data; and
   associating one or more category labels with the profile data based on the phrases identified in the free-form text data and the adjusted weights assigned to the phrases identified in the free-form text data.

4. The method of claim 1, further comprising targeting an advertisement based on the one or more associated category labels.

5. The method of claim 1, wherein identifying the phrases includes identifying psychographic information in the profile data.

6. The method of claim 1, wherein associating the one or more category labels includes associating the one or more category labels based on a phrase with a highest adjusted weight.

7. The method of claim 1, wherein assigning the weights includes assigning a value to each phrase.

8. The method of claim 1, wherein:
   identifying the phrases includes identifying a number of nouns and a number of adjectives in at least one identified phrase;
   assigning weights to the phrases includes assigning a weight to the at least one identified phrase based at least in part on the number of nouns in the at least one identified phrase; and
   adjusting the weights includes adjusting the weight assigned to the at least one identified phrase based at least in part on the number of adjectives in the at least one identified phrase.

9. The system of claim 2, wherein the memory further includes instructions executable by the data processing apparatus and upon such execution cause the data processing apparatus to perform operations comprising:
   receiving an advertisement based on the one or more associated category labels.

10. The system of claim 2, wherein the phrases include one or more noun phrases; and
  wherein the instructions cause the data processing apparatus to identify one or more nouns and related adjectives in the one or more noun phrases.

11. The system of claim 2, wherein the instructions cause the data processing apparatus to identify one or more positive or negative verbs and related nouns in the phrases.

12. The system of claim 2, wherein the memory further includes instructions executable by the data processing apparatus and upon such execution cause the data processing apparatus to perform operations comprising:
  identifying the phrases includes identifying a number of nouns and a number of adjectives in at least one identified phrase;
  assigning weights to the phrases includes assigning a weight to the at least one identified phrase based at least in part on the number of nouns in the at least one identified phrase; and
  adjusting the weights includes adjusting the weight assigned to the at least one identified phrase based at least in part on the number of adjectives in the at least one identified phrase.

13. The computer storage medium of claim 3, wherein the instructions cause the data processing apparatus to perform operations comprising:
  receiving an advertisement based on the one or more associated category labels.

14. The computer storage medium of claim 3, wherein the phrases include one or more noun phrases; and
  wherein the instructions cause the data processing apparatus to identify one or more nouns and related adjectives in the one or more noun phrases.

15. The computer storage medium of claim 3, wherein the instructions cause the data processing apparatus to identify one or more positive or negative verbs and related nouns in the phrases.

16. The computer storage medium of claim 3, wherein the instructions cause the data processing apparatus to perform operations comprising:
  identifying the phrases includes identifying a number of nouns and a number of adjectives in at least one identified phrase;
  assigning weights to the phrases includes assigning a weight to the at least one identified phrase based at least in part on the number of nouns in the at least one identified phrase; and
  adjusting the weights includes adjusting the weight assigned to the at least one identified phrase based at least in part on the number of adjectives in the at least one identified phrase.

17. The method of claim 7, wherein identifying the phrases includes identifying one or more keywords indicative of sentiments in each identified phrase.

18. The method of claim 17, wherein:
  identifying the one or more keywords includes identifying interests and non-interests in relation to the one or more keywords in each identified phrase; and
  associating the one or more category labels includes associating the one or more category labels based on the phrases, the adjusted weights, the interests and the non-interests.

19. The method of claim 17, wherein:
  identifying the one or more keywords includes performing a polarity analysis on the one or more keywords to identify one or more positive or negative verbs and related nouns; and
  assigning the value includes assigning the value based on the one or more identified positive or negative verbs and related nouns.

\* \* \* \* \*

UNITED STATES PATENT AND TRADEMARK OFFICE
CERTIFICATE OF CORRECTION

| | | |
|---|---|---|
| PATENT NO. | : 8,341,169 B2 | Page 1 of 1 |
| APPLICATION NO. | : 12/727186 | |
| DATED | : December 25, 2012 | |
| INVENTOR(S) | : Megan Nance | |

It is certified that error appears in the above-identified patent and that said Letters Patent is hereby corrected as shown below:

Title Page, Line 9, Column 1, delete "San Fracisco" and insert -- San Francisco, --, therefor.

Title Page, Line 11, Column 1, delete "Mountian View" and insert -- Mountain View; --, therefor.

Signed and Sealed this
Fifth Day of March, 2013

Teresa Stanek Rea
*Acting Director of the United States Patent and Trademark Office*